United States Patent [19]

Soler Font

[11] 3,978,564
[45] Sept. 7, 1976

[54] WINDING MACHINE

[76] Inventor: Eduardo Soler Font, 5 Puigreig St., Barcelona, Spain

[22] Filed: Jan. 23, 1975

[21] Appl. No.: 543,605

[52] U.S. Cl.............................. 29/33 F; 242/1.1 R
[51] Int. Cl.².................................... B65H 81/06
[58] Field of Search................. 29/33 F, 33 L, 35.5, 29/596, 605, 205 D; 242/1.1 R, 1.1 A, 4 R, 5, 7.05 R, 7.05 A, 7.05 B, 7.05 C

[56] References Cited
UNITED STATES PATENTS

| | | | |
|---|---|---|---|
| 1,977,828 | 10/1934 | Laib et al............... | 242/1.1 R |
| 2,632,602 | 3/1953 | Weis..................... | 242/1.1 R |
| 3,081,043 | 3/1963 | Morrill................... | 242/1.1 R |
| 3,281,916 | 11/1966 | Goldsmith............. | 29/33 F |

*Primary Examiner*—Othell M. Simpson
*Assistant Examiner*—Fred A. Silverberg
*Attorney, Agent, or Firm*—Townsend and Townsend

[57] ABSTRACT

At least two flat co-planar supports are arranged at the outer periphery of a circular fixed table. A plurality of ancillary devices are disposed around the table and a winding mechanism including an even number of winding spindles extending to the supports, is arranged generally below the table. The supports are displaceable around the table independently of each other, and each support includes as many stations as there are winding spindles. All the spindles are operated simultaneously.

9 Claims, 19 Drawing Figures

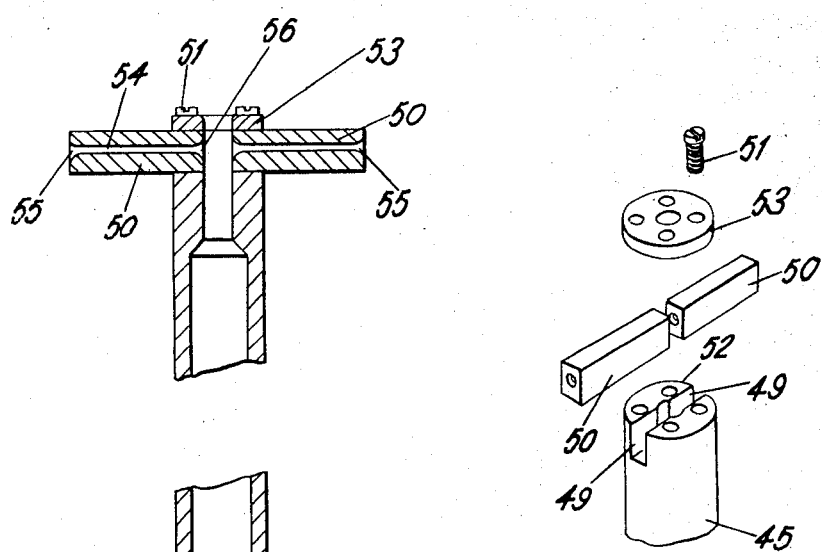
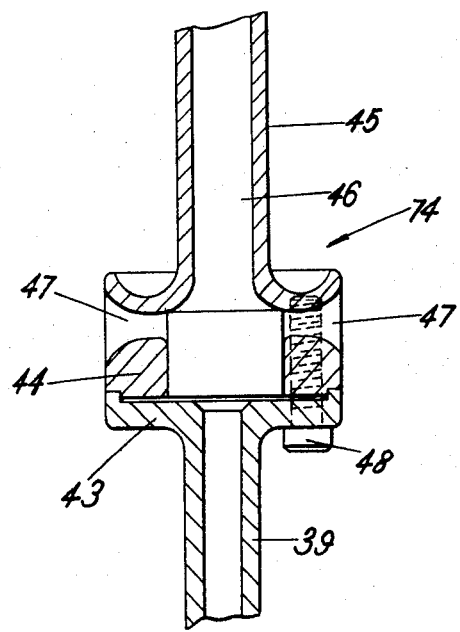
FIG. 15
FIG. 13.
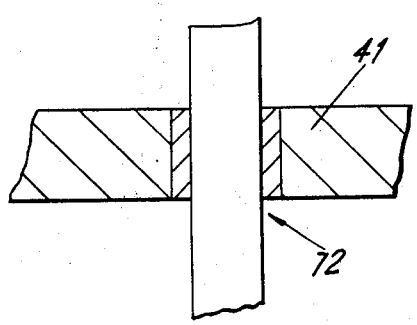

WINDING MACHINE

BACKGROUND OF THE INVENTION

The winding of collector motor inductors or shaded-pole stators is carried out by two main methods:
a. by building up the coils on formers and then transferring them on to the poles by hand;
b. by winding the wire directly on to the previously insulated stator by means of needle-type or other machines.

For mass production purposes, use is generally made of the second of these methods on account of its greater output.

The needle-type machines at present commercially available suffer from a number of disadvantages:

Their cost is high compared with the production that can be achieved with them, since only two stators can be wound at the same time.

Their use is limited exclusively to winding the wire on the stator, and they cannot be employed for carrying out additional associated operations.

Oil leakage occurs at the joint between the sleeve of the case enclosing the mechanism and the tool to which reciprocatory movement is imparted and which passes through the sleeve, and through the bore of which the wire is fed.

To change the angle of oscillation of the needle (for 2, 4, 6, 8 etc. poles), it is necessary to carry out operations which call for lengthy and careful work on the part of qualified personnel.

SUMMARY OF THE INVENTION

The object of the invention is to provide a winding machine of the needle type, particularly for winding stators of electric motors having shaded or universal poles in which the winding mechanism is so designed that the inertia forces generated therein cancel each other.

In this specification and claims the term 'stators' is used for simplicity and is intended to include stators, rotors and other members which may be provided with a winding, including mandrels for winding.

BRIEF DESCRIPTION OF THE DRAWINGS

In the drawings:

FIG. 13 shows the wire inlets within the winding spindle, FIG. 15 is a fragmentary, exploded view of the upper end of the spindle and needle shown in FIG. 13.

DETAILED DESCRIPTION OF THE PREFERRED EMBODIMENT

Figure 1:
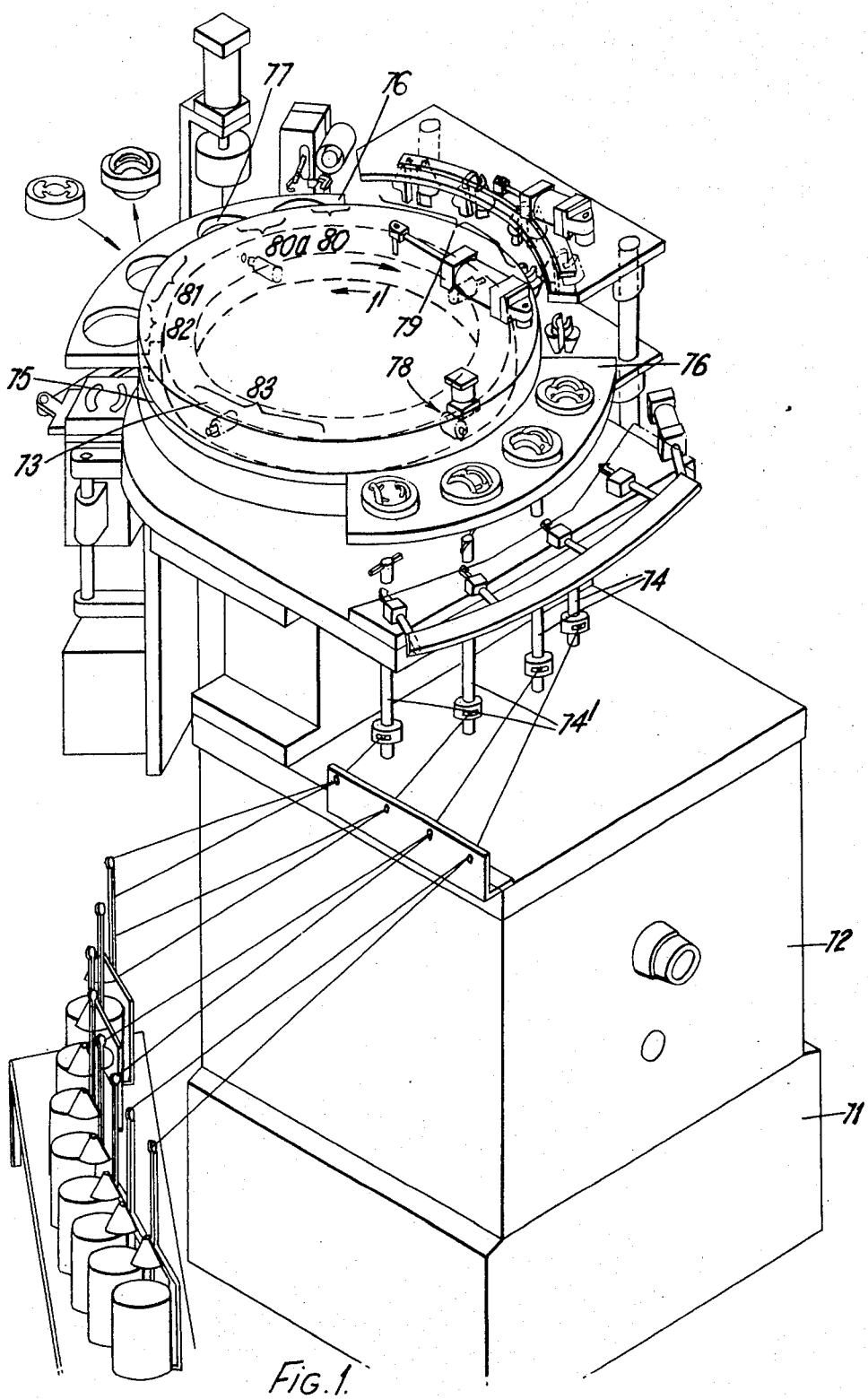
FIG. 1 is a general view of the machine.

A machine according to the invention comprises a base 71, a machine case 72 and an upper table 73 (FIG. 1).

The base 71 houses a drive motor, brakes, a cooling-oil circulating system etc.

The machine case 72 houses the mechanisms for moving the four winding spindles 74 which project from the above-mentioned case and wind wire on to the stators that have been secured in the working position.

The upper table 73, which is of circular form, comprises a channel 75 in which oscillate two ring sectors 76 each having four seats 77 for accomodating the stators to be wound.

By imparting a programmed movement to said sectors 76, the machine can be put to the fullest use. While one of the sectors 76 is in the winding position in which the stators are being wound, the other sector may be brought into position 79 where the formers required for winding two-pole stators are withdrawn. The sector occupying position 79 may be immediately moved in a stepwise manner through a position 80 where the ends of the coils are automatically secured, while in position 80a a pressing or shaping operation can be carried out. Position 81 may be used for charging the wound stator and fitting a fresh stator, and in position 82 the stator that has been charged at position 81 can be automatically insulated. When the four seats in the sector 76 and the stators fitted therein have passed through position 82, the sector 76 returns to position 79 where the formers are automatically fitted on the stators which are then moved by the sector 76 to position 83 to await completion of the winding of the stators which are at position 78. When winding is completed the sector 76 which is in position 78 moves into position 79, and the sector 76 which is in the waiting postion 83 moves into position 78, thus initiating a new cycle.

In this type of machine winding is achieved by means of a winding head comprising a spindle 74 and a needle 50 through the hollow interior of which the wire is fed. The opposite ends of the needle 50 are marked A and B. The winding head executes two alternating movements namely a rectilinear reciprocating movement and a rotary movement. FIGS. 2A through 2E show diagrammatically the various stages in the movement of the winding head in relation to the stator being wound, and to make the drawing clearer, there is shown a two-pole stator, only one of the poles of which is being wound.

Figure 3:
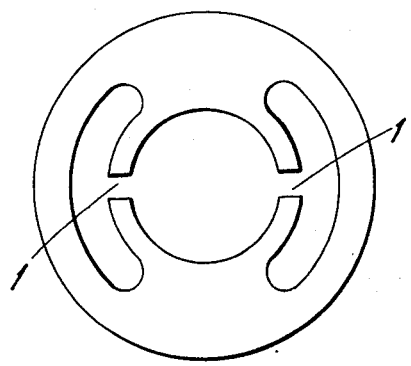
FIG. 3 is a plan of a stator.

FIG. 3 shows the form of the cover plate of the motor that is being wound; in this figure can be seen the slots 1 through which the needle 50 has to pass during its upward and downward movement. The needle 50 reciprocates in a vertical direction through the slots 1.

Figure 4:
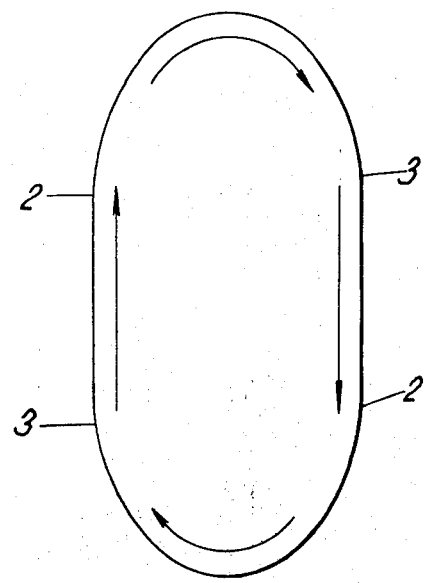
FIG. 4 is a sketch showing the movement that the wire has to execute for the winding operation.

When the needle 50 is in a position outside the slot 1, the rotary movement can begin. However, the path travelled by the end A of the needle 50 will be constituted by a figure having two straight parallel sides, and two other sides commencing at points 3 of FIG. 4 which are curved and deformed and commence at points 2 of FIG. 4. Between points 2 and 3 the needle rotates and moves in a veritcal direction. FIG. 4 shows the horizontal projection of this path; the vertical component of the path is not shown in FIG. 4.

Figure 2A:
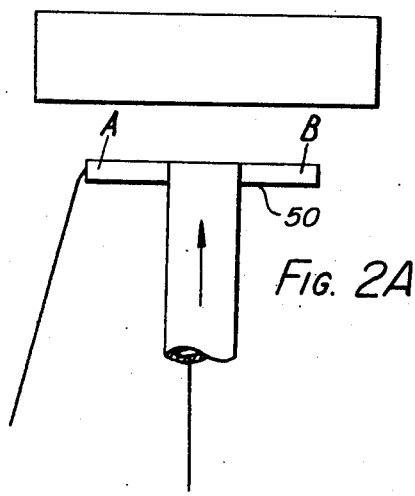
FIG. 2A–2E show the various phases of the movement for winding the stators.
Figure 2C:
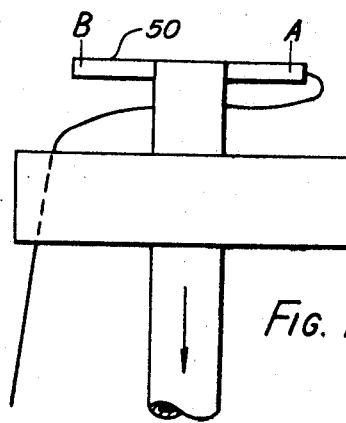
Figure 2B:
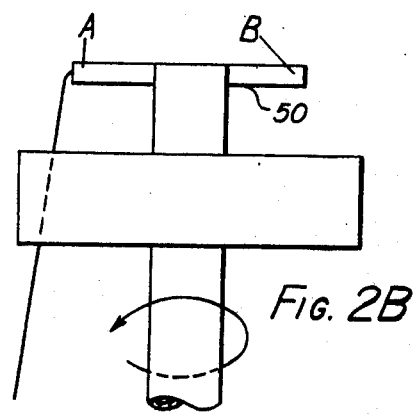
Figure 2D:
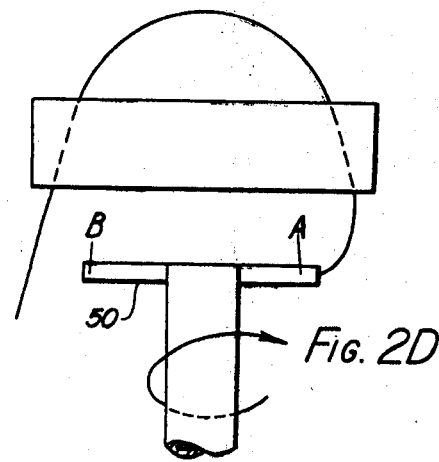
Figure 2E:
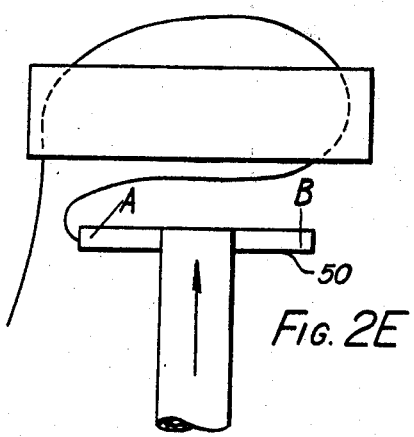

With a view to operating at the maximum possible speed, a purely sinusoidal movement has been selected for the straight portions, whereas in the curved portions use is made of a combination of the same sinusoidal movement mentioned above and a gyratory cycloidal movement which commences when the end A of the needle 50 is in position shown in FIG. 2B and ceases when it is in the position shown in FIG. 2C.

Figure 5:
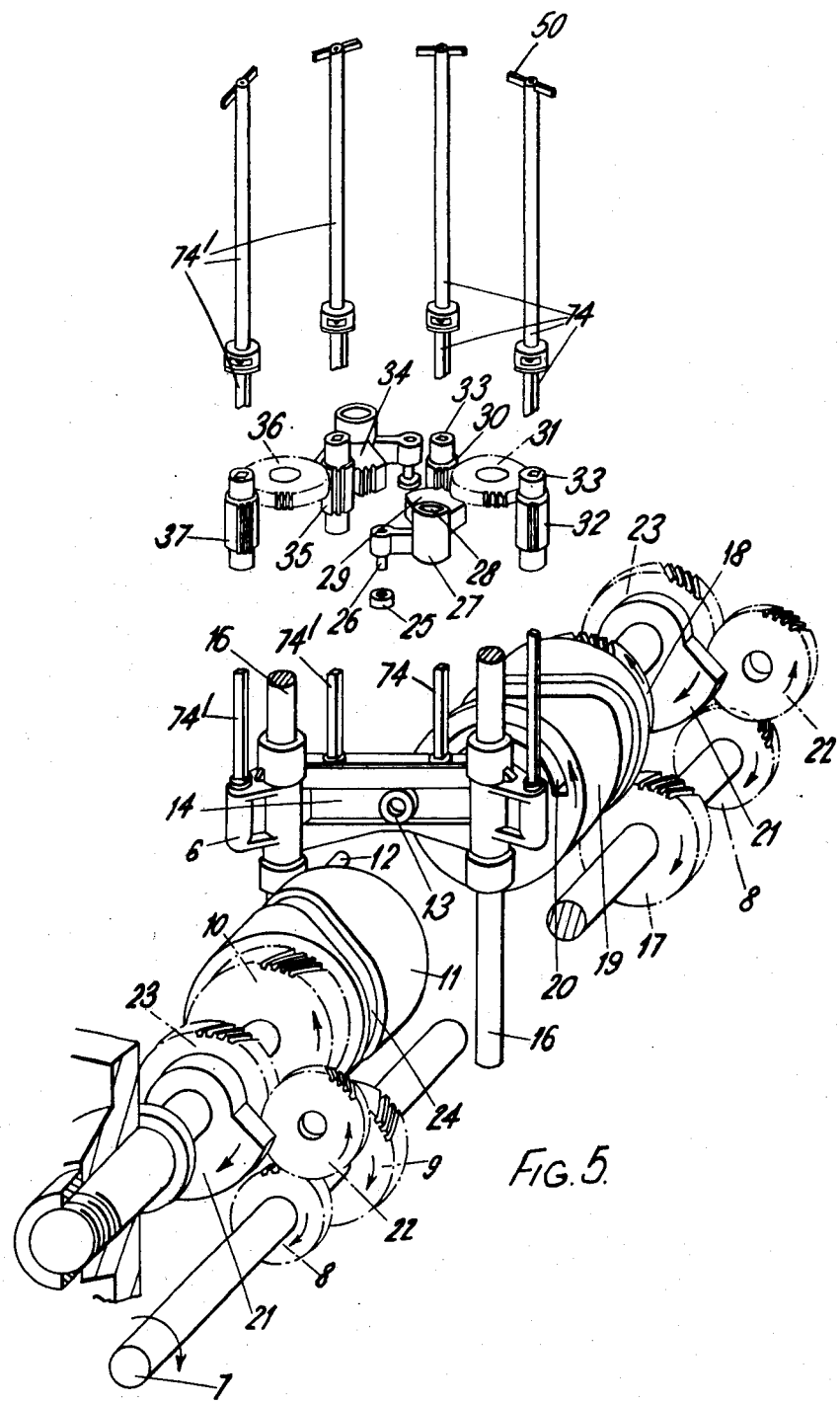
FIG. 5 is a perspective view of the overall arrangement of the mechanisms of the machine.
Figure 6:
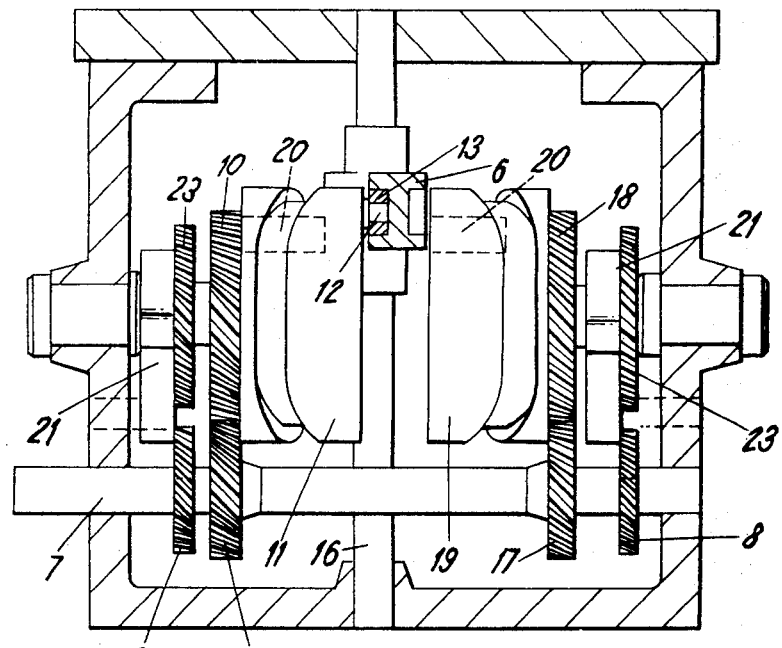
FIG. 6 is a diagrammatic drawing of the machine case in side view.

The sinusoidal rectilinear movement can be satisfactorily achieved in various ways: in the present case the system now to be described by reference to FIGS. 5 and 6 has been selected as being the most suitable as regards the gyratory movement of the winding heads.

The movement of the winding heads, each of which includes a needle 50 and is solidly connected to a winding spindle 74 which is in turn secured to a reciprocating member 6, is imparted by a drive motor connected to a shaft 7. When the shaft 7 rotates it drives a gear 9, which drives a gear 10 firmly connected to a cam 11 which carries a pivot 12. A roller 13 which rotates freely on the pivot 12, runs in a groove 14 in the member 6, thus causing the latter to continuously reciprocate in the vertical direction on two columns 16.

A gear 17 meshes with a gear 18 which is solidly connected to a cam 19 which is driven in the same direction as the cam 11 which is arranged symmetrically thereto.

Formed in each of the two cams 11 and 19 is a cavity 20 which is dimensioned to imbalance the cams so that the remaining mass of the cams acts as a counterweight to offset one half of the vertical force of inertia of the member 6 and the winding spindles 74 mounted thereon.

In order to offset the other half of the imbalance of the member 6, together with the spindles 74 and the heads, there are provided two counter weights 21 which are actuated by the shaft 7 through a gear train 8, 22 and 23, and rotate in the direction opposite to that of cams 11 and 19.

The action resulting from the imbalance of the cams 11 and 19, together with the action of the two counter-weights 21, fully balances the force of inertia of the member 6, the spindles 74 and the heads in the vertical direction.

Figure 7:
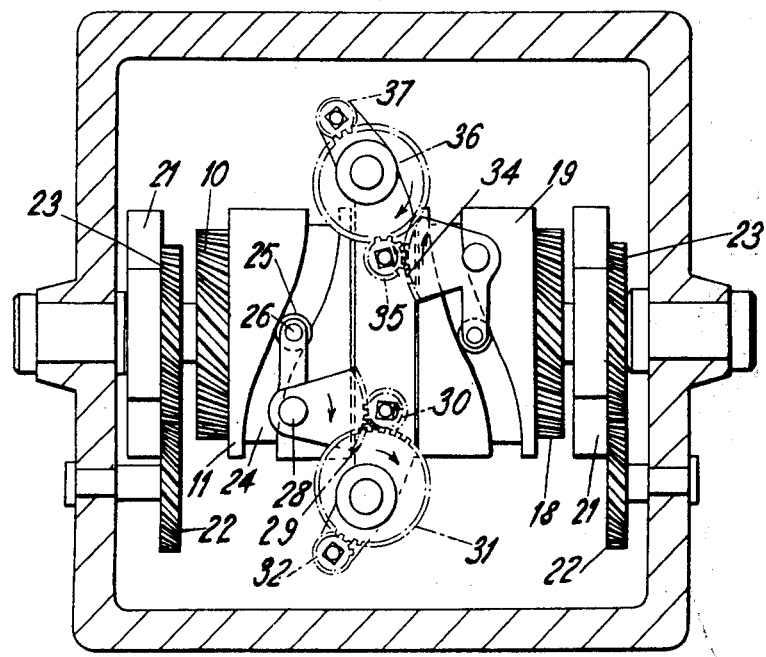
FIG. 7 is a diagrammatic plan view of the machine case.

The alternating rotary movement is imparted to the winding heads by the same main drive motor through the shaft 7 and a mechanism now to be described with reference to FIGS. 5 and 7.

The cam 11 has a peripheral groove 24 in which engages a roller 25. The roller 25 is mounted on the arm 26 of a lever 27 which pivots about a shaft solidly connected to the machine frame and fitted in an opening 28.

The other end of the lever 27 is formed by a toothed sector 29, the centre of curvature of which coincides with that of the opening 28.

When the cam 11 rotates, the lever 27 executes an alternating movement of a kind which will be determined by the shape of the groove 24 in the cam 11. In the present case there occurs for each turn: a stationary phase and a rotary movement to the right, another stationary phase and a rotary movement to the left.

As already stated, the rotary movements occur in accordance with a cycloidal function. When the sector 29 executes rotary movements about its centre, it drives a pinion 30 which in turn drives a gear 31 which drives a gear 32.

Both the pinion 30 and the gear 32 have a square central hole 33 through which can slide the winding spindle 74 which is of the same shape. The rotary movement and the stationary plases of the gears 30 and 32 are communicated to the winding heads through the spindles 74.

Similarly, rotary movement is transmitted from the cam 19 to the spindles 74' and the corresponding winding heads by way of a sector 34 and gears 35, 36, and 37.

It will be seen that the two sets of gears 29, 30, 31, 32 and 34, 35, 36, 37 always rotate at the same speed and rate of acceleration and in the same directions so that a balanced system is achieved.

The reaction forces applied to the machine frame through the cam shafts and the shafts of the gear trains 29, 30, 31, 32, 34, 35, 36, 37 are the same in opposite directions and are fully compensated and absorbed by the rigid frame.

This set of mechanisms results in a machine able to wind four stators simultaneously, which machine occupies a considerably reduced amount of space and operates without vibration and noise.

Figure 8:
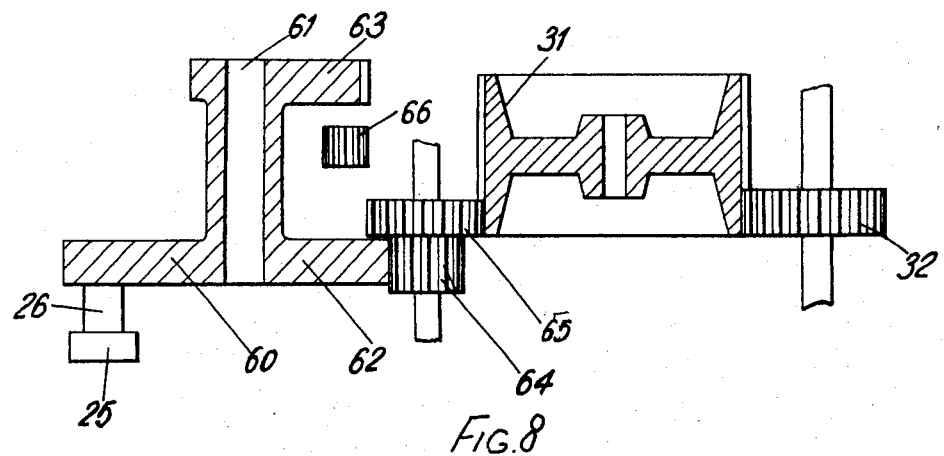
FIGS. 8, 9 and 10 show the mechanism for varying the oscillation of the winding needle depending on the number of poles of the motor to be wound.
Figure 10:
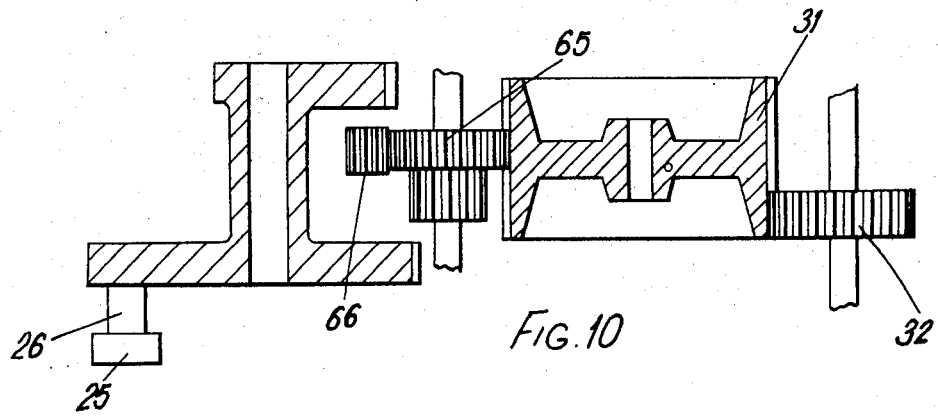
Figure 9:
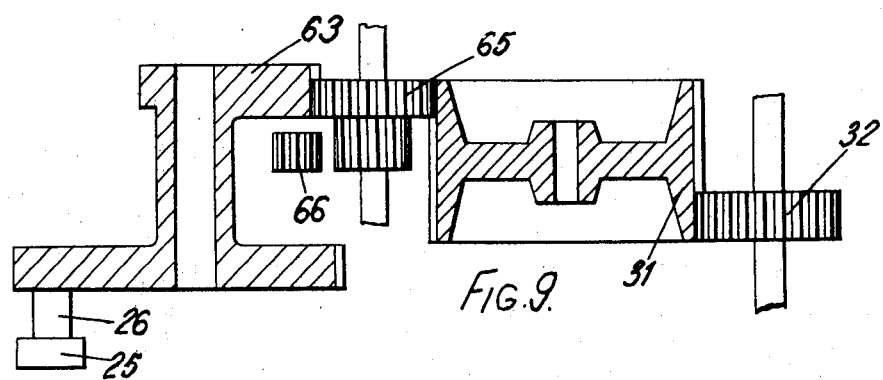

FIGS. 8 to 10 show a further arrangement for transmitting a rotary movement from the cams 11 or 19 to the winding spindles 74 and 74', which arrangement enables the angle of oscillation and its position in relation to the stator to be varied by simply displacing pinions 64, 65 in the axial direction.

In this case, the gear train 29, 30, 32 is modified in the following way: The toothed sector 29 is lever 60 (FIGS. 8 to 10) which pivots about an axial 61 and carries two toothed sectors 62 and 63 of different basic radii, and instead of the pinion 30 there are provided two coaxial pinions 64 and 65, each having a central opening of square cross-section.

The pinion 65 meshes continuously with the gear 31 which in turn meshes with the gear 32.

The roller 25, mounted on the arm 26 of the lever 60, engages in the groove 24 in the cam 11 and, on account of the rotation of the latter, causes the toothed sectors 62 and 63 to move about the axis 61.

FIG. 8 shows that the rotation of the sector 62 is transmitted to the pinion 64 and from this to the gear 32 through the intermediate gear 31. Depending upon the ratio of the basic diameter of the toothed sector 62 to that of the pinion 64, a predetermined angle of rotation or turning of the winding spindles 74 and 74' will be achieved. (The gears 65 and 32 have the same pitch diameter).

By axially displacing the pinions 64 and 65 so that transmission takes place between the sector 63 and the pinion 65, as in the position shown in FIG. 9, the relationship of the pitch diameters and thus the angle of oscillation of the winding spindles 74 and 74' can be varied. If, in the intermediate position in which there is no engagement or meshing between either of the sectors 62 and 63 and either of the pinions 64 and 65, then as shown in FIG. 10, by means of an ancillary pinion 66 or a rack performing the same function, rotation through an angle $\alpha$ is imparted to the pinion 65, and rotation through the same angel $\alpha$ is imparted to the gear 32 by way of the gear 31, so that the orientation of the spindles can be varied by the required amount $\alpha$.

Figure 11:
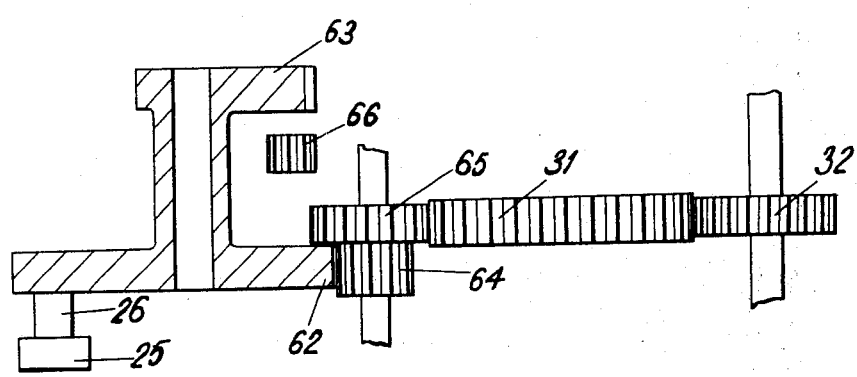
FIGS. 11 and 12 show the same mechanism for altering oscillation as in FIGS. 8, 9 and 10, but with a different system for operating it.
Figure 12:
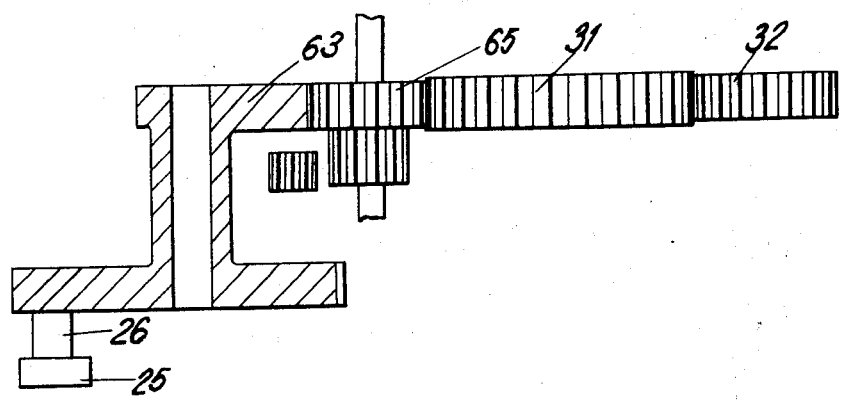

Another arrangement for achieving a change in the angle of oscillation and for obtaining any required orientation of the spindle is shown in FIGS. 11 and 12. These figures show the same gear trains as in FIG. 8 but with the feature that, whereas in the FIG. 8 arrangement only the unit formed by the pinions 64 and 65 could be displaced, in the arrangement according to FIGS. 11 and 12 the entire system, constituted by the components 64, 65, 31, 32 can be displaced. FIGS. 11 shows the position for a large angle of oscillation, whereas FIG. 12 shows the position for a small angle of oscillation.

In the intermediate position in which the sector 63 is not engaged with the pinion 65, and the sector 62 is not engaged to the pinion 64, the train of gears 65, 31 and 32 can be caused to rotate by means of the pinion 66 or a rack performing the same function, so that the desired orientation of the spindle is achieved.

The path for the travel of two copper wires to be coiled can be seen from FIGS. 13 and 15 which shows a section through a winding spindle 74 and its head. The spindle 74 comprises a lower part 39 of square cross-section, the lower part of which is introduced into the case 72 through a sleeve inserted in the wall of the case 72. Within the case 72, the lower part 39 is connected to the reciprocating member 6 by means of an articulated joint which enables it to rotate freely about its axis. At its upper end the lower part 39 has an expanded portion 43 forming a platform which is adapted to receive a lower expanded portion 44 of an upper part 45 which has a central bore 46 which communicates with the exterior through the lower expanded portion 44 and by way of a number of highly polished openings 47 having rounded edges. The expanded portions 43 and 44 are solidly connected to each other by means of screws 48 which extend through oval holes in the extended portion 43 and screw into the lower portion 44. The oval holes enable the needles 50 to be accurately centred in relation to the slots 1 in the stators.

Formed in the top of the upper part 45 are two or more notches 49 depending upon the number of poles required to be wound at the same time, and the needles 50 are fitted in these notches 49. By means of screws 51 which are screwed into openings 52 in the upper part 45, a force is transmitted through a washer 53 so that a low pressure is applied to the needles 50 between the upper part 45 and the washer 53, and this prevents any displacement of the needles 50 in relation to the upper part 45.

Each of the needles 50 has a bore 54, outlets 55 and inlets 56 of which have rounded edges and are highly polished. To prevent grooving at the inlets 56 by the constant rubbing of the copper wire, the needles 50 are made of a very hard material.

The copper wires, fed from bobbins, pass through the openings 47, and after having passed upwards through the central bore 46, enter the respective needles 50 through the respective inlets 56, and having passed through the bore 54, emerge through the outlet 55, to be wound on to the pole-pieces of the stators by the combination of reciprocating rectilinear and circular movements.

It is also possible for example to secure the needles 50 and the winding spindles by means of an intermediate part on which the needles are held in the same way described for securing them to the winding spindles. The intermediate part can be connected to the spindles 74 and 74' in any one of a large number of ways.

Figure 14:
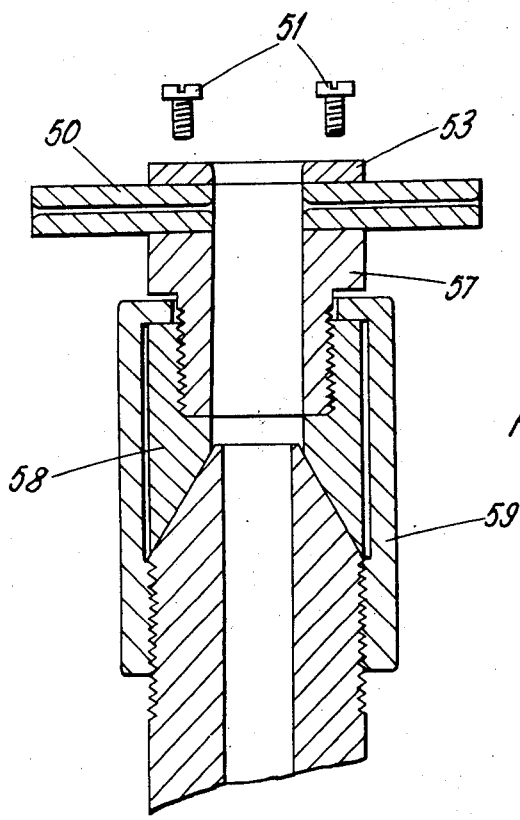
FIG. 14 shows a means for securing the top end of the spindle which enables each winding spindle to be repaired.

One method involves the use of a connection by means of a collet, as illustrated in FIG. 14. In this particular case, the intermediate part is a member 57 to which the needles 50 are securely mounted, as previously described, by means of the washer 53 and the screws 51. A tapered bush 58 is screwed on to the member 57 the spindle 74 and the bush 58 being held together by a socket 59. At the lower end of the bush 58 is a conical recess adapted to receive the tapered upper end of the winding spindle 74. The latter has a screw-thread for connecting the lower end of the socket 59, the only function of which is to enable the tapered end of the spindle to be connected and disconnected by the screwing and unscrewing actions and by its reactions in relation to the parts 58 and 57.

I claim:

1. A winding machine of the needle type, particularly for winding stators of electric motors having shaded or universal poles, comprising a circular fixed table, at least two flat co-planar supports arranged at the outer periphery of the table, and a winding mechanism arranged generally below the table and including an even number of winding spindles extending to the vicinity of the plane containing the supports, the supports being alternately displaced around the table independently of each other and according to a predetermined program to a number of preparatory positions and a winding position, each support having arranged therealong as many stations as there are winding spindles, each station being designed to accommodate a stator, the winding mechanisms being adapted to wind simultaneously all the stators accommodated in one support when that support is in the winding position, each support passing through a preparatory position at which each wound stator is removed and an unwound stator substituted therefor.

2. A winding machine according to claim 1, wherein each of the supports has four stations and the winding mechanism has four winding spindles.

3. A machine according to claim 1 comprising a case situated below the table in which are accommodated means for driving the winding mechanism, the winding spindles projecting through the upper part of the case, each spindle being hollow and provided with inlet and outlet openings for wires used for the winding, the inlet openings being situated above the upper part of the case.

4. A machine according to claim 3 wherein each of said inlets is provided intermediate of the spindle.

5. A machine according to claim 1 wherein the spindles are connected to a reciprocating member, and means defining a balancing system offsetting the imbalance caused by the reciprocating movement of said member with said shafts.

6. A machine according to claim 1 wherein each support has an even number of stations and the winding mechanism has the same number of winding spindles, the spindles being divided into two substantially symmetrically arranged groups each containing the same number of spindles and each being driven by a separate driving unit including a cam-actuated oscillating toothed sector and a gear train which is driven by the sector and in which all the gears and sectors which oscillate the spindles oscillate in the same direction, which is opposite to that of the spindles so that the inertia in one direction is offset by the inertia in the opposite direction.

7. A machine according to claim 6 wherein in each unit a change of the angle of oscillation is achieved by providing two toothed sectors forming a single part and having a different pitch radius but a common axis of rotation and two coaxial gears forming a single part and having a different pitch diameter, one of the two parts being axially displaceable to engage the other part to provide a selected gear transmission therebetween.

8. A machine according to claim 7 in which, for the purpose of centering the winding spindles, a first gear of the gear part is rotated by means of a gear engaging mechanism when it is in a position between the two sectors of the sector part.

9. A machine according to claim 1 in which each of the winding spindles is composed of two elongated parts interconnected at their adjacent ends by screws which pass through elongated openings in one of the parts whereby the upper part of the spindle carrying a needle, may be finally adjusted in relation to the slots in the stator.

* * * * *